United States Patent
Zhu et al.

(10) Patent No.: US 9,809,722 B2
(45) Date of Patent: Nov. 7, 2017

(54) TRANSITORIALLY ERASABLE INK COMPOSITIONS AND WRITING INSTRUMENTS CONTAINING SAME

(71) Applicant: SANFORD, L.P., Downers Grove, IL (US)

(72) Inventors: Jiandong Zhu, Aurora, IL (US); Wing Sum Vincent Kwan, Chicago, IL (US)

(73) Assignee: SANFORD, L.P., Atlanta, GA (US)

( * ) Notice: Subject to any disclaimer, the term of this patent is extended or adjusted under 35 U.S.C. 154(b) by 156 days.

(21) Appl. No.: 14/788,320

(22) Filed: Jun. 30, 2015

(65) Prior Publication Data

US 2017/0002217 A1 Jan. 5, 2017

(51) Int. Cl.
| | |
|---|---|
| *B43K 5/00* | (2006.01) |
| *B43K 7/03* | (2006.01) |
| *B43K 8/02* | (2006.01) |
| *C09D 11/16* | (2014.01) |
| *C09D 11/18* | (2006.01) |
| *C09D 107/00* | (2006.01) |

(52) U.S. Cl.
CPC ................ *C09D 11/16* (2013.01); *B43K 5/00* (2013.01); *B43K 7/03* (2013.01); *B43K 8/02* (2013.01); *C09D 11/18* (2013.01); *C09D 107/00* (2013.01)

(58) Field of Classification Search
CPC ...... C09D 11/16; C09D 107/00; C09D 11/18; B43K 5/00; B43K 8/02; B43K 7/03
See application file for complete search history.

(56) References Cited

U.S. PATENT DOCUMENTS

| | | | |
|---|---|---|---|
| 2,413,904 A | 1/1947 | Biro | |
| 2,435,123 A | 1/1948 | Biro | |
| 2,495,013 A | 1/1950 | Martin | |
| 3,130,711 A | 4/1964 | Eckerle | |
| 3,282,255 A | 11/1966 | Killen | |
| 3,420,610 A | 1/1969 | Malm | |
| 4,097,290 A | 6/1978 | Muller et al. | |
| 4,410,643 A * | 10/1983 | Muller | C09D 11/18 401/209 |
| 5,945,484 A | 8/1999 | Fukasawa | |
| 6,149,720 A | 11/2000 | Asada et al. | |
| 6,632,273 B2 | 10/2003 | Hayashi et al. | |
| 7,655,082 B2 | 2/2010 | Zhu | |
| 8,784,546 B2 | 7/2014 | Ugajin et al. | |
| 2007/0050927 A1 | 3/2007 | Cole et al. | |

FOREIGN PATENT DOCUMENTS

| | | |
|---|---|---|
| BE | 517217 A | 2/1953 |
| FR | 1053515 A | 2/1954 |
| FR | 1055674 A | 2/1954 |

OTHER PUBLICATIONS

The definition of "alkali blue" from https://www.merriam-webster.com/dictionary/alkali%20blue, date unknown, pp. 1-10.*

* cited by examiner

*Primary Examiner* — Patrick Niland

(74) *Attorney, Agent, or Firm* — Marshall, Gerstein & Borun LLP

(57) ABSTRACT

The disclosure provides transitorially erasable ink compositions, including an aliphatic hydrocarbon solvent, a rubber dissolved in the aliphatic hydrocarbon solvent, a hydrophilic pigment, and a surfactant. The disclosure further provides methods of preparing transitorially erasable ink compositions and writing instruments comprising transitorially erasable ink compositions. The disclosed erasable ink compositions write well, have strong color and erase easily transitorially, and demonstrate color stability.

20 Claims, No Drawings

TRANSITORIALLY ERASABLE INK COMPOSITIONS AND WRITING INSTRUMENTS CONTAINING SAME

FIELD OF THE DISCLOSURE

The disclosure is generally related to an erasable ink composition and, in one aspect, to a transitorially erasable ink composition comprising a rubber dissolved in an aliphatic hydrocarbon solvent, a surfactant, and a hydrophilic pigment.

BRIEF DESCRIPTION OF RELATED TECHNOLOGY

Rubber based erasable ball-point pen inks are often made by either blending rubber solution with compatible pigment dispersions or by dispersing compatible dry pigments into rubber solution with or without compatible pigment dispersants, resulting in high viscosity erasable ball-point pen ink compositions that can be made into ball-point pens under pressure. Such pen inks are disclosed in U.S. Pat. No. 4,097,290, herein incorporated by reference in its entirety. The high viscosity of the ink composition allows the ink composition to stay on the surface of paper and have temporary erasability. However, the erasability is not ideal because the rubber compatible pigment also touches the paper and frequently stains the paper instantly when ink is applied onto the paper.

SUMMARY

Disclosed herein are erasable ink compositions, including an aliphatic hydrocarbon solvent, a rubber dissolved in the aliphatic hydrocarbon solvent, a hydrophilic pigment, and a surfactant.

In a related aspect, the disclosure provides writing instruments containing erasable ink compositions including an aliphatic hydrocarbon solvent, a rubber dissolved in the aliphatic hydrocarbon solvent, a hydrophilic pigment, and a surfactant.

In another related aspect, the disclosure provides a method of making an erasable ink composition including combining an aliphatic hydrocarbon solvent, a rubber, a hydrophilic pigment, and a surfactant and mixing the aliphatic hydrocarbon solvent, rubber, hydrophilic pigment, and surfactant to provide a homogenous dispersion, thereby forming the erasable ink composition.

Further aspects of the disclosure may become apparent to those skilled in the art from a review of the following detailed description, taken in conjunction with the appended claims. While the disclosure is susceptible of embodiments in various forms, described herein are specific embodiments of the disclosure with the understanding that the disclosure is illustrative, and is not intended to limit the invention to specific embodiments disclosed herein.

DETAILED DESCRIPTION

The disclosure provides transitorially erasable ink compositions, including an aliphatic hydrocarbon solvent, a rubber dissolved in the aliphatic hydrocarbon solvent, a hydrophilic pigment, and a surfactant. The disclosed erasable ink compositions write well, have strong color and erase easily transitorially, and demonstrate color stability.

The ink compositions according to the disclosure are generally substantially free of water. As used herein, the term "substantially free of water" means that the erasable ink compositions according to the disclosure include less than about 8 weight percent ("wt. %") water, less than about 5 wt. % water, less than about 3 wt. % water, or less than about 2 wt. % water, based on the total weight of the ink. As the amount of water is increased, the stability of the ink decreases resulting in the separation of the ink components and, therefore, reduced erasability. The ink compositions typically exclude water based pigment dispersions including commercially available water based pigment dispersions and also lab-made water based pigment dispersions.

As used herein and unless specified otherwise, "hydrophilic pigment" means a hydrophilic pigment, for example, an inorganic pigment or an organic pigment including two or more hydrophilic surface groups, or an inorganic or organic pigment with hydrophilic surfaces treated either chemically or physically (which is sometimes referred to as pigment preparation, if treated heavily), and combinations thereof. Suitable hydrophilic surface groups include, but are not limited to, amide, amine, hydroxyl, carboxyl, alkoxy, carbonyl, esters, ethers, salts of the foregoing, and combinations thereof. Physical adsorption of polymers and/or surfactants is one method of modifying pigment surfaces or making pigments hydrophilic. Suitable polymers for pigment modification include, but are not limited to, polymers bearing heteroatoms capable of forming hydrogen bonds with the pigment surface. Polymers bearing heteroatoms can include, but are not limited to, polymers comprising carboxylic acids, esters, imides, amines, anhydrides, ketones, imines, alcohols, aldehydes, amides, or combinations thereof.

By providing a hydrophilic pigment in a solvent having a rubber dissolved therein, the ink has temporary erasability and color stability. The combination of a rubber dissolved in a solvent and a hydrophilic pigment has been found to prevent staining of the paper temporarily. Without intending to be bound by theory, it is believed that the erasability can be attributed to the purposefully designed incompatibility of the ink composition in that the rubber continuous phase contacts the substrate prior to the pigment contacting the substrate when the ink is applied onto a paper substrate.

Notably, the ink compositions according to the disclosure are not water-in-oil emulsion inks, i.e., the ink compositions do not include droplets of a first aqueous phase in a second oil phase in which the aqueous phase is not miscible. Thus, there is no water phase and no water phase separation and unlike a water-in-oil emulsion ink, the inks of the disclosure do not display the stability issues often seen with water-in-oil emulsion inks.

The inks of the disclosure initially provide an intensely colored trace, which is transitorially erasable, i.e., a written mark made using the ink is capable of being easily erased shortly after writing (e.g., for a period of about two to about 24 hours after initial writing) and will become permanent and substantially non-erasable upon aging (e.g., after about 2 to 24 hours) for normal copy or writing paper. The duration of transitorial erasability can depend on the substrate and the conditions of the writing (e.g., temperature of the paper, temperature of the ink, and the ambient temperature). Generally, inks will be transitorially erasable for shorter time periods as the porosity of paper increases. Further, inks will be transitorially erasable for shorter time periods as the ambient temperature increases.

In a related aspect, the disclosure provides writing instruments containing erasable ink compositions including an aliphatic hydrocarbon solvent, a rubber dissolved in the aliphatic hydrocarbon solvent, a hydrophilic pigment, and a surfactant. The ink compositions disclosed herein can be used in various writing instruments including but not limited to ball pens such as ball-point pens, roller pens, and gel pens, fountain pens, and writing instruments comprising fibrous ink reservoirs or fibrous nibs writing instruments, such as felt tip pens and capillary-action markers. In one aspect, the ink compositions are provided in a pressurized refill for a ball-point pen and/or a pressurized ball-point pen.

In another related aspect, the disclosure provides a method of making an erasable ink composition including combining an aliphatic hydrocarbon solvent, a rubber, a surfactant, and a hydrophilic pigment and mixing the aliphatic hydrocarbon solvent, rubber, surfactant, and hydrophilic pigment to form a homogenous dispersion, thereby forming the erasable ink composition.

Ranges may be expressed herein as from "about" or "approximately" one particular value and/or to "about" or "approximately" another particular value. When such a range is expressed, another embodiment includes from the one particular value and/or to the other particular value. Similarly, when particular values are expressed as approximations, but use of antecedents such as "about," "at least about," or "less than about," it will be understood that the particular value forms another embodiment.

The method of the disclosure includes combining an aliphatic hydrocarbon solvent, a rubber, a surfactant, and a hydrophilic pigment and mixing the aliphatic hydrocarbon solvent, rubber, surfactant, and hydrophilic pigment to form a homogenous dispersion, thereby forming the erasable ink composition. In some embodiments, the method comprises combining the aliphatic hydrocarbon solvent, the rubber, and a surfactant and mixing the aliphatic hydrocarbon solvent, rubber, and surfactant to form a mixture, and adding a hydrophilic pigment to the mixture and mixing to provide a homogenous dispersion, thereby forming the erasable ink. In some embodiments, the rubber and the solvent can initially be mixed together to form a homogenous solution followed by addition of the surfactant and then the pigment and mixing until homogeneous.

Solvents

In general, the solvent can be any aliphatic hydrocarbon solvent capable of solubilizing rubber. The aliphatic hydrocarbon solvent generally is a liquid at room temperature, but may include aliphatic hydrocarbons which are solids or semi-solids at room temperature.

The aliphatic hydrocarbon solvent can include C5-C15 hydrocarbons, or C6-C12 hydrocarbons. The aliphatic hydrocarbon solvent can be comprised of alkanes and cycloalkanes. Examples of suitable C5-C15 hydrocarbon alkanes include but are not limited to hexanes, heptanes, octanes, nonanes, decanes, undecanes, dodecanes, cyclohexane, methylcyclohexane, or mixtures of the foregoing. The aliphatic hydrocarbon solvent can comprise a mineral oil comprising C15-C40 hydrocarbons.

The aliphatic hydrocarbon solvent can be provided as a blend of components, for example, derived from petroleum. In one aspect, the aliphatic hydrocarbon solvent is characterized by a boiling point in the range of about 40° C. to about 300° C. and more preferably from about 80° C. to about 200° C. Exemplary blended solvents include mineral spirits and naphtha solvents. Typically, the solvent has a low aromatic content, e.g., less than 35 wt. %, less than 10 wt. %, or less than 1 wt. %, based on the total weight of the hydrocarbon solvent. Suitable solvents include, but are not limited to, dioctylphthalate (DOP) or other oil compatible plasticizers, aliphatic petroleum naphtha, naphtha blends, mixtures of hydrotreated isoparaffins and naphthenics or cycloparaffins with very low levels of aromatics, low aromatic mineral spirits, mineral oils, or combinations thereof.

The solvent can be included in the ink composition in an amount in a range of about 15 wt. % to about 90 wt. %, about 20 wt. % to about 80 wt. %, about 25 wt. % to about 75 wt. %, about 30 wt. % to about 70 wt. %, or about 30 wt. % to about 50 wt. %, based on the total weight of the ink.

Rubber

The rubber of the ink composition can be any natural or synthetic rubber which is soluble in an aliphatic hydrocarbon solvent. Suitable rubbers include, but are not limited to, natural pale crepe rubber or synthetic rubber essentially duplicating the chemical structure of natural rubber, such as "Natsyn" which is 90% or more cis-1,4-polyisoprene, or Nipol® IR Polyisoprene which is high purity grade of synthetic cis-1,4-polyisoprene (from Zeon Corp), or Buna CB polybutadiene rubber from Lanxess, some epichlorohydrin elastomers, or combinations thereof.

The rubber, whether natural or synthetic, can have an average molecular weight of between about 70,000 and 900,000 Da, between about 100,000 and 800,000 Da, between about 200,000 and about 700,000 Da, between about 300,000 and about 600,000 Da, or between about 300,000 and 500,000 Da. Milling or mastication under controlled conditions can be used to secure the desired molecular weight.

The rubber can be included, but is not limited to, in the ink composition in an amount in the range of about 10 wt. % to about 50 wt. %, about 15 wt. % to about 45 wt. %, about 15 wt. % to about 40 wt. %, about 20 wt. % to about 40 wt. %, about 25 wt. % to about 35 wt. %, or about 25 wt. % to about 32 wt. %, based on the total weight of the ink.

The rubber, when dissolved in the solvent provides a rubber solution continuous phase. The rubber solution is hydrophobic/oil-like, which is typically not compatible with hydrophilic pigments as described herein (including polar pigments) or hydrophobic pigments with hydrophilic surface either by chemical surface modification or physical surface modification or water based pigment dispersions. Without intending to be bound by theory, it is believed that the compatibility of the hydrophilic pigments of the disclosure and the rubber solution continuous phase is attributable to the interaction of the surfactant with the hydrophilic pigment. It is believed that hydrophilic pigments are well protected by the surfactant molecules and thus are sufficiently compatible with the rubber solution continuous phase so as not to phase separate, while maintaining the incompatibility desired to provide the effect of having the rubber continuous phase contact a substrate prior to the pigment contacting the substrate when the ink is applied onto a paper substrate.

Hydrophilic Pigment

The hydrophilic pigment can be any pigment having a hydrophilic and/or polar surface. Suitable pigments can include, but are not limited to, dry powdery pigments. As described above, the term hydrophilic pigment encompasses hydrophilic pigments including but not limited to polar pigments, for example, inorganic pigments, organic pigments including two or more hydrophilic surface groups, or combinations thereof. Hydrophilic organic pigments having two or more hydrophilic surface groups can be prepared by introduction of hydrophilic surface groups to hydrophobic pigments having less than two hydrophilic surface groups using synthetic techniques that are known in the art. For example, organic pigments with hydrophilic surface group modifications can be prepared either by chemical surface modification or physical surface modification as is known in the art. Suitable hydrophilic surface groups are selected from the group consisting of amide, amine, hydroxyl, carboxyl, alkoxy, carbonyl, esters, ethers, salts of the foregoing, and combinations of the foregoing. Suitable hydrophilic pigments include but are not limited to easy-to-disperse-in-water (EDW) pigment preparations, and/or pigments that are especially treated (either chemically or physically or both) for water based inks and/or coatings, and/or polar and hydrophilic inorganic pigments, or combinations thereof.

Most organic pigments are neither hydrophilic nor polar while most inorganic pigments are both polar and hydrophilic. Hydrophilic and/or polar inorganic pigments can be used in the inks of the disclosure without further modification. Further, organic pigments having at least two hydrophilic surfaces and/or organic pigments modified to have at least two hydrophilic surface groups either by chemical modification and/or physical modification of the pigment surface can be used in the inks of the disclosure. Examples of suitable hydrophilic surface groups include, but are not limited to, amide, amine, hydroxyl, carboxyl, alkoxy, carbonyl, esters, ethers, salts of the foregoing, or combinations thereof. Organic pigments modified to have hydrophilic surfaces provide an ink with strong color intensity.

Examples of suitable pigments include, but are not limited to, organic pigments having at least two hydrophilic surface groups such as Pigment Red 170, Pigment Red 254, Pigment Red 188, Pigment Blue 60, Pigment Violet 19, Pigment Orange 13, or Pigment Red 122; hydrophilic pigments and polar pigments, such as titanium dioxide, iron oxide, and other metal oxide pigments; hydrophobic pigments that can be/have been modified to have hydrophilic surfaces, such as carbon black pigments with surface oxidation (chemically modified), such as Colour Black FW 200 and Special Black 4 from Orion or carbon black with both surface oxidation (chemically modified) and surface adsorption (physically modified), such as Dery Black 450FW; organic pigments for water based inks and coatings (which are treated by surfactants and/or polymers), such as JHB-7000W (PB 15:0) and JHG-301W (PG 7) from JECO pigment USA, TCB15304TS (PB15:3) from Trust Chem USA LLC; a line of easy to disperse pigment preparations for water from JECO, such as X-408D (PB 15:3) and a line of EDW (easy to disperse in water) pigment preparation from Clariant, such as Hostaperm Red D3G 70-EDW and Hostaperm Pink E-EDW LV3907. The hydrophilic pigment can be included in the ink composition in an amount in a range of about 5 wt. % to about 50 wt. %, about 10 wt. % to about 35 wt. %, or about 15 wt. % to about 25 wt. %, based on the total weight of the ink.

When used in a ball point pen, the hydrophilic pigments can have any suitable average particle size for a ball-point pen. For example, suitable pigment particle sizes are in a range of about 0.001 microns to about 5 microns in at least one of its dimensions. When the pigment particle size is less than about 0.001 microns in at least one of its dimensions the resulting written trace may not have sufficient visibility. When the pigment particle size is greater than about 5 microns in at least one of its dimensions, the pigment my not be able to flow from a ball-point pen due to the ball-point clearance; that is, the gap between the ball and the retaining lip of the socket.

When used in a marker or felt tip pen, the hydrophilic pigments can have any suitable particle size for a marker or felt tip pen. For example, suitable pigment particle sizes are in a range of about 0.1 microns to about 200 microns in at least one of its dimensions, for example greater than about 0.5 microns in at least one of its dimensions, or greater than about 1 micron in at least one of its dimensions. The colorant pigment particle size, however, should not exceed 200 microns. In one aspect, the pigment particle size is between about 1 micron and about 30 microns, for example, between about 2 microns and 15 microns, or between about 5 microns and 10 microns. If the colorant pigment should is too small (i.e., less than 0.1 microns in the largest of its dimensions) then the written trace may not have sufficient visibility. Larger colorant pigment particles tend to remain on the surface of porous material and exhibit an enhanced opacity and erasability as a result.

Surfactant

The surfactant can be any surfactant having a strong affinity to the hydrophilic surface of the pigment. Suitable surfactants include, but are not limited to, water-in-oil emulsifiers and/or other rubber compatible pigment dispersants with very good affinity to hydrophilic and/or polar surfaces of the pigment. Examples of suitable surfactants include, but are not limited to, water-in-oil emulsifiers, such as Gransurf water in oil emulsifiers (Gransurf 50C-HM, Gransurf 67, Gransurf 90, Gransurf NR-WO and/or Gransurf W9) from Grant Industries, Silube water in oil emulsifiers (Silube J208-812, Silube J208-612, and/or Silube T308-16) from Siltech Corporation, Tegopren 7008 from Evonik, and/or pigment dispersants such as Hypermer polymeric pigment dispersants from Croda, oleic acid, lauric acid, and steric acid, or combinations thereof. Polymeric pigment dispersants have a strong affinity to hydrophilic pigments and also good oil compatibility for stabilizing hydrophilic pigments in an oil phase.

The surfactant can be included in an ink composition in an amount in a range of about 2 wt. % to about 20 wt. %, about 2 wt. % to about 15 wt. %, about 5 wt. % to about 15 wt. %, about 3 wt. % to about 14 wt. %, about 4 wt. % to about 13 wt. %, about 5 wt. % to about 12 wt. %, or about 5 wt. % to about 10 wt. % based on the total weight of the ink.

The hydrophilic pigments are well protected by the surfactant molecules and are provided as a discontinuous phase in the rubber solution continuous phase.

The erasable ink generally has a viscosity suitable for use in the desired writing instrument. Generally, the ink viscosity is in the range of 1 centipoises (cps) to 2,000,000 cps depending upon the desired writing instruments. For example, when the ink composition is used in a pressurized ball-point pen, the viscosity of the ink composition at 25° C. is usually greater than about 750 cps, greater than about 100,000 cps, greater than about 200,000 cps, for example about 750 cps to about 1,500,000 cps, about 1000 cps to about 800,000 cps, or about 200,000 cps to about 750,000 cps as measured at 0.5 RPM with a Brookfield viscometer.

In some embodiments, the ink of the disclosure further comprises a hydrophilicity enhancing agent, including but not limited to, up to about 8 wt. % water, glycerol, or a mixture thereof, based on the total weight of the ink. Ink properties and performance of inks including pigments having a weakly hydrophilic surface can be enhanced by the inclusion of a limited amount of water or a hydrophilicity enhancing agent, resulting in an ink having an increased water-in-oil emulsion character, provided that the ink compositions are substantially free of water as described above. As mentioned above, including greater than 8 wt. % water has been found to have a detrimental effect on erasability and/or ink stability. Thus, the erasable ink compositions according to the disclosure typically include less than about 8 wt. %, less than about 5 wt. %, less than about 3 wt. %, or less than about 2 wt. % water or hydrophilicity enhancing agent, based on the total weight of the ink.

In some embodiments, the ink of the disclosure further comprises up to about 5 wt. % hydrophobicity enhancing agents and/or rheology modifiers or agent. Ink properties and performance of inks can be enhanced by the inclusion of hydrophobicity enhancing agents, including but not limited to, Versaflow, an oil phase soluble polyethylene from Shamrock Technologies, and/or rheology modifier or agents, including but not limited to, Ircogel, an oil phase rheology/viscosity modifier, from Lubrizol, resulting in an ink having increased incompatibility between the hydrophilic pigment and the hydrophobic rubber continuous phase, increased ink stability, and/or increased ink erasability.

The erasable ink of the disclosure can further include additional conventional additives such as corrosion inhibitors, resins to increase permanence, stabilizing agents, preservatives, parting compounds (between ink in a reservoir and a gaseous pressurizing agent), lubricants, releasing agents, or combinations thereof.

Writing Instrument

Writing instruments comprising a writing point in fluid communication with an ink reservoir can be used. The writing instrument can be ball pens such as ball-point pens, roller pens, and gel pens, fountain pens, and writing instruments comprising fibrous ink reservoirs or fibrous nibs writing instruments, such as felt tip pens and capillary-action markers.

In one preferred aspect, the writing instrument is a ball-point writing instrument containing an ink capable of depositing an easily visible colored trace by writing with the ball on paper, said trace being transitorially capable of erasure by mechanical means (as by a pencil eraser) without destructive abrasion of the paper.

When the writing instrument comprises a ball-point pen, the ball-point pen comprises a barrel containing tubular cartridge for the ink, the cartridge having a writing tip end including a socket in which a writing ball is rotatably held, the back of the ball being in communication with a body of ink in the cartridge (these physical elements have been known and need no illustration, but U.S. Pat. Nos. 2,435,123; 2,459,013; and 2,413,904 may be referred to for examples and are herein incorporated by reference in their entirety).

When the writing instrument comprises a ball-point pen used in combination with pressurized cartridges, the erasable inks of the disclosure tend to be viscous. The writing instrument, or the cartridge with its body of ink, may be provided with means for subjecting the body of ink to a superatmospheric pressure in order to facilitate the flow and supply of ink to the ball. The precise pressure required will depend upon the gap between the ball and the lip of the ball-retaining socket, and upon the ink viscosity. The required pressure may be applied during actual writing by the use of the writing pressure actuated pressurizing device of the character shown in U.S. Pat. No. 3,420,610, or by the use of a suitable gas injected into or generated within the cartridge above the body of ink as indicated in numbers patents including U.S. Pat. No. 3,130,711; Belgian Pat. No. 517,217; French Pat. Nos. 1,053,515; 1,055,674, or pressurized by manual means as in U.S. Pat. No. 3,282,255, all of which are herein incorporated by reference in their entirety. The use of many gases has been contemplated, including air, nitrogen, carbon dioxide, dichlorotetrafluoroethylene, octafluoro and decafluoro cyclobutane, etc. Inert or non-reactive gases are preferred.

The phrase "means for subjecting the ink within the cartridge to a superatmospheric pressure" refers to any of the above means and methods and to their equivalents, it being understood that the pressure may vary with the characteristics of the ink, the gap in the ball-point, the ambient temperature and the relative volume of ink and the gas in the cartridge.

The required pressure can be in a range of about 15 to about 100 psi. For example, the ink of the writing instrument can be under a positive pressure of about 78 psi.

The ink compositions, methods, and writing instruments in accordance with the disclosure can be better understood in light of the following examples, which are merely intended to illustrate the writing instruments and ink compositions and are not meant to limit the scope thereof in any way.

EXAMPLES

Example 1

A writing instrument comprising red ink of the disclosure was prepared as follows. 8 grams of Tegopren 7008 (Evonik) and 72 grams of a rubber solution (Sanford) were mixed thoroughly. 20 grams of HOSTAPERM RED D3G 70-EDW (Clariant) was added and mixed thoroughly. The mixture was milled in a Speedmixer and thoroughly mixed until homogenous. 0.5 grams of the resultant ink was injected into a refill tube fitted with a writing tip under nitrogen at a pressure of 78 psi. The resulting pen demonstrated good writing performance and erasability of the written trace.

Example 2

A writing instrument comprising green ink of the disclosure was prepared as follows. 8 grams of Tegopren 7008 (Evonik) and 72 grams of a rubber solution (Sanford) were mixed thoroughly, then 20 grams of green pigment (Lansco Colors) was added and mixed thoroughly. The mixture was then milled in a Speedmixer, and thoroughly mixed until homogenous. 0.5 grams of the resultant ink was injected into a refill tube fitted with a writing tip under nitrogen at a pressure of 78 psi. The resulting pen demonstrated good writing performance and erasability of the written trace.

Example 3

A writing instrument comprising black ink of the disclosure was prepared as follows. 8 grams of Tegopren 7008 (Evonik) and 70 grams of a rubber solution (Sanford) were mixed thoroughly, then 20 grams of Dery Black 450FW (Dery Chemical) was added and mixed thoroughly. The mixture was then milled in a Speedmixer and thoroughly mixed until homogenous. 2 g of water was added to the ink composition and thoroughly mixed until homogenous.

Alternatively, a writing instrument comprising blank ink of the disclosure was prepared by mixing 8 grams of Tegopren 7008 (Evonik) with 70 grams of a rubber solution (Sanford) thoroughly, then adding 20 grams of carbon black pigment (Dery Chemical) and mixing thoroughly. 2 g water was then added to the ink composition and mixed thoroughly. The mixture was then milled in a Speedmixer and thoroughly mixed until homogenous.

0.5 grams of each of the resultant black inks were injected into two refill tubes fitted with a writing tip under nitrogen at a pressure of 78 psi. The resulting pens demonstrated good writing performance and erasability of the written trace.

What is claimed:

1. An erasable ink composition, comprising:
   an aliphatic hydrocarbon solvent;
   a rubber dissolved in the aliphatic hydrocarbon solvent;
   a hydrophilic pigment; and
   a surfactant.

2. The ink composition of claim 1, wherein the pigment is provided in an amount between about 5 wt. % and about 50 wt. %, based on the total weight of the ink.

3. The ink composition according to claim 1, wherein the rubber is provided in an amount between about 10 wt. % to about 50 wt. %, based on the total weight of the ink.

4. The ink composition according to claim 1, wherein the solvent is provided in an amount between about 15 wt. % to about 90 wt. %, based on the total weight of the ink.

5. The ink composition according to claim 1, wherein the surfactant is provided in an amount between about 2 wt. % and about 20 wt. %, based on the total weight of the ink.

6. The ink composition according to claim 1, wherein the aliphatic hydrocarbon solvent comprises at least one of aliphatic petroleum naphtha, naphtha blends, mixtures of hydrotreated isoparaffins with naphthenics having low levels of aromatics, mixtures of hydrotreated isoparaffins with cycloparaffins having low levels of aromatics, and oil compatible plasticizers.

7. The ink composition according to claim 1, wherein the hydrophilic pigment comprises at least two hydrophilic groups selected from the group consisting of amide, amine, hydroxyl, carboxyl, alkoxy, carbonyl, esters, ethers, salts of the foregoing, and combinations of the foregoing.

8. The ink composition according claim 1, wherein the hydrophilic pigment is selected from the group consisting of easy-to-disperse-in-water (EDW) pigment preparations, pigments treated for water based inks or coatings, polar and hydrophilic inorganic pigments, and combinations thereof.

9. The ink composition according to claim 1, wherein the composition is substantially free of water.

10. The ink composition according claim 9, wherein the composition comprises less than 8 wt. % water, based on the total weight of the ink composition.

11. The ink composition according to claim 1, wherein the hydrophilic pigment is a dry powdery pigment.

12. The ink composition according to claim 1, wherein the surfactant is at least one selected from the group consisting of water-in-oil emulsifiers, pigment dispersants, and combinations thereof.

13. The ink composition according to claim 1, further comprising less than about 8 wt. %, based on the total weight of the ink, of a hydrophilicity enhancing agent selected from the group consisting of water, glycerol, and combinations thereof.

14. The ink composition according to claim 1, further comprising up to about 5 wt. %, based on the total weight of the ink, of a hydrophobicity enhancing agent and/or a rheology modifier.

15. The ink composition according to claim 1, the ink composition having a viscosity in a range of about 1 cps to about 2,000,000 cps.

16. A writing instrument comprising the ink composition according to claim 1.

17. The writing instrument of claim 16, wherein the writing instrument is a ball-point pen and the ink is under positive pressure in the range of 15 to 100 psi.

18. A method of making an erasable ink composition comprising:
   combining an aliphatic hydrocarbon solvent, a rubber, a surfactant and a hydrophilic pigment; and
   mixing the solvent, rubber, surfactant, and hydrophilic pigment to provide a homogeneous dispersion, thereby forming the erasable ink composition.

19. The ink composition according to claim 1, wherein the aliphatic hydrocarbon solvent is provided in an amount between about 20 wt. % to about 50 wt. %, based on the total weight of the ink.

20. The ink composition according to claim 1, wherein the hydrophilic pigment is provided in an amount in a range of about 5 wt. % to about 10 wt. %, based on the total weight of the ink.

* * * * *